United States Patent [19]
Sato

[11] Patent Number: 5,845,383
[45] Date of Patent: Dec. 8, 1998

[54] METHOD OF MANUFACTURING BAITCASTING REELS

[75] Inventor: Jun Sato, Sakai, Japan

[73] Assignee: Shimano, Inc., Osaka, Japan

[21] Appl. No.: 804,570

[22] Filed: Feb. 24, 1997

Related U.S. Application Data

[60] Continuation of Ser. No. 410,749, Mar. 27, 1995, abandoned, which is a division of Ser. No. 215,017, Mar. 21, 1994, Pat. No. 5,480,102, which is a continuation of Ser. No. 739,491, Aug. 2, 1991, abandoned.

[30] Foreign Application Priority Data

| Aug. 6, 1990 | [JP] | Japan | ................................. 2-83343 |
| Aug. 6, 1990 | [JP] | Japan | ................................. 2-83344 |
| Aug. 6, 1990 | [JP] | Japan | ................................. 2-83345 |
| Aug. 6, 1990 | [JP] | Japan | ............................... 2-208810 |
| Aug. 7, 1990 | [JP] | Japan | ................................. 2-83881 |

[51] Int. Cl.⁶ .......................... B23P 11/00; B22D 23/00
[52] U.S. Cl. ............................. 29/428; 29/460; 29/557; 29/558; 29/527.5; 29/527.6; 164/69.1; 264/138
[58] Field of Search ................................. 29/460, 527.2, 29/527.3, 527.5, 527.6, 557, 558, 428; 242/310, 312, 313, 314, 315, 316, 317, 318, 321; 164/69.1, 76.1; 264/138, 148, 150, 154

[56] References Cited

U.S. PATENT DOCUMENTS

| 2,686,016 | 8/1954 | Kilian . |
| 4,821,978 | 4/1989 | Kaneko . |
| 4,905,903 | 3/1990 | Puryear et al. . |

*Primary Examiner*—S. Thomas Hughes
*Attorney, Agent, or Firm*—Knobbe, Martens, Olson & Bear, LLP

[57] ABSTRACT

A method of forming a baitcasting reel is disclosed, the baitcasting reel being formed by two end cases provided on either end of a spool and connected by an integral reel body. The reel body may form a portion of either of the end cases. Each of the cases forms a wall having a spool inserting opening which may be formed by the reel body. Further, each of the cases are enclosed by an outer wall portion.

21 Claims, 17 Drawing Sheets

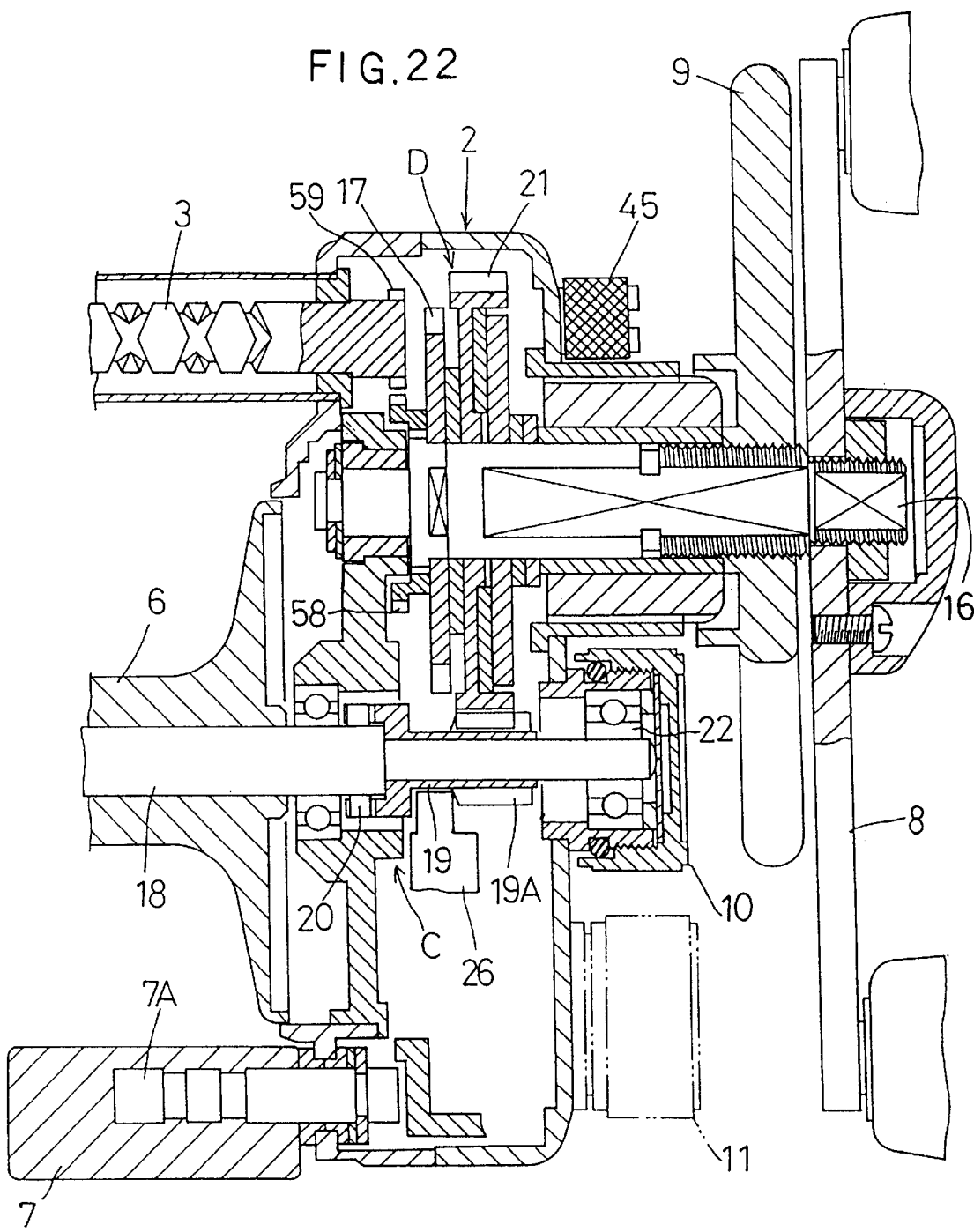

METHOD OF MANUFACTURING BAITCASTING REELS

This application is a continuation of Ser. No. 08/410,749 filed Mar. 27, 1995, which is now abandoned, which is a divisional of Ser. No. 08/215,017 filed Mar. 21, 1994, which is now U.S. Pat. No. 5,480,102, which is a continuation of Ser. No. 07/739,491 filed on Aug. 2, 1991, which is now abandoned.

BACKGROUND OF THE INVENTION

1. Field of the Invention

This invention relates to baitcasting reels and a method of manufacturing the same. More particularly, the invention relates to a baitcasting reel having a level wind mechanism and a spool arranged between right and left cases forming a reel body, and to a method of manufacturing such reels.

2. Description of the Related Art

Conventionally, a relatively large reel designed for use in trolling or the like and having no level wind mechanism has part of one of the cases, the other case and a thumb rest interconnecting the two cases, all formed into an integral unit of a single material such as an aluminum alloy to secure increased strength.

In the case of a relatively small reel having a level wind mechanism such as a baitcasting reel with which casting and reeling are repeated frequently, it is desirable to employ a strong structure of a single material as noted above to withstand external forces.

A reel body formed of a single material needs to define a larger space inside the reel body than an opening through which the spool is inserted in position, in order to reduce the weight of the other case noted above and to secure an interior space for accommodating other components.

Such a space may be formed by sand mold casting or lost wax casting. However, this type of casting involves a large number of manufacturing steps to the detriment of improvement of working efficiency. It is also impossible to secure high precision with respect to thickness of thin wall portions, leaving room for improvement from the point of view of lightness of the reel.

SUMMARY OF THE INVENTION

An object of the present invention is to provide an improved baitcasting reel having a reel body formed of a single material as noted above to secure excellent strength, a space for accommodating components, and lightness of the reel.

The above object is fulfilled, according to the present invention, by a baitcasting reel comprising right and left cases constituting a reel body, and a level wind mechanism and a spool disposed between the right arid left cases, wherein a portion adjacent the spool of one of the right and left cases, the other case and components interconnecting the cases are formed of a single material, the right and left cases defining walls opposed to the spool for supporting the level wind mechanism, the other case defining an interior space larger than a spool inserting opening formed in the wall of the other case.

In another aspect of the present invention, a method of manufacturing a baitcasting reel comprising the steps of forming a portion adjacent a spool of one of right and left cases constituting a reel body, the other case and components interconnecting the right and left cases of a single material, forming walls in positions of the cases opposed to the spool for supporting a level wind mechanism, and forming in the other case an interior space larger than a spool inserting opening formed in the wall of the other case.

The present invention provides the following functions and effects.

The above reel may be formed by die casting with a relatively high efficiency as shown in FIG. 10. Subsequently, as shown in FIG. 11, a cutting operation may be carried out with a tool inserted through a spool introducing opening 1H. The left case 1 may be formed to have a relatively small wall thickness which is maintained with high precision.

Thus, according to the present invention, the case 1 may be shaped to have a relatively small wall thickness as desired, though the reel body is formed of a single material and walls 1S and 2S are formed for supporting the level wind mechanism extending therebetween.

An improved, lightweight baitcasting reel is provided which has increased strength secured by forming the reel body with a single material, and which includes a component accommodating space formed in an effective way.

BRIEF DESCRIPTION OF THE DRAWINGS

The drawings show baitcasting reels and a method of manufacturing the reels according to the present invention, in which:

FIGS. 22 and 23 are a sectional view and a side view showing a transmission system for a level wind mechanism in a further embodiment.

DETAILED DESCRIPTION OF THE PREFERRED EMBODIMENTS

Figure 1:
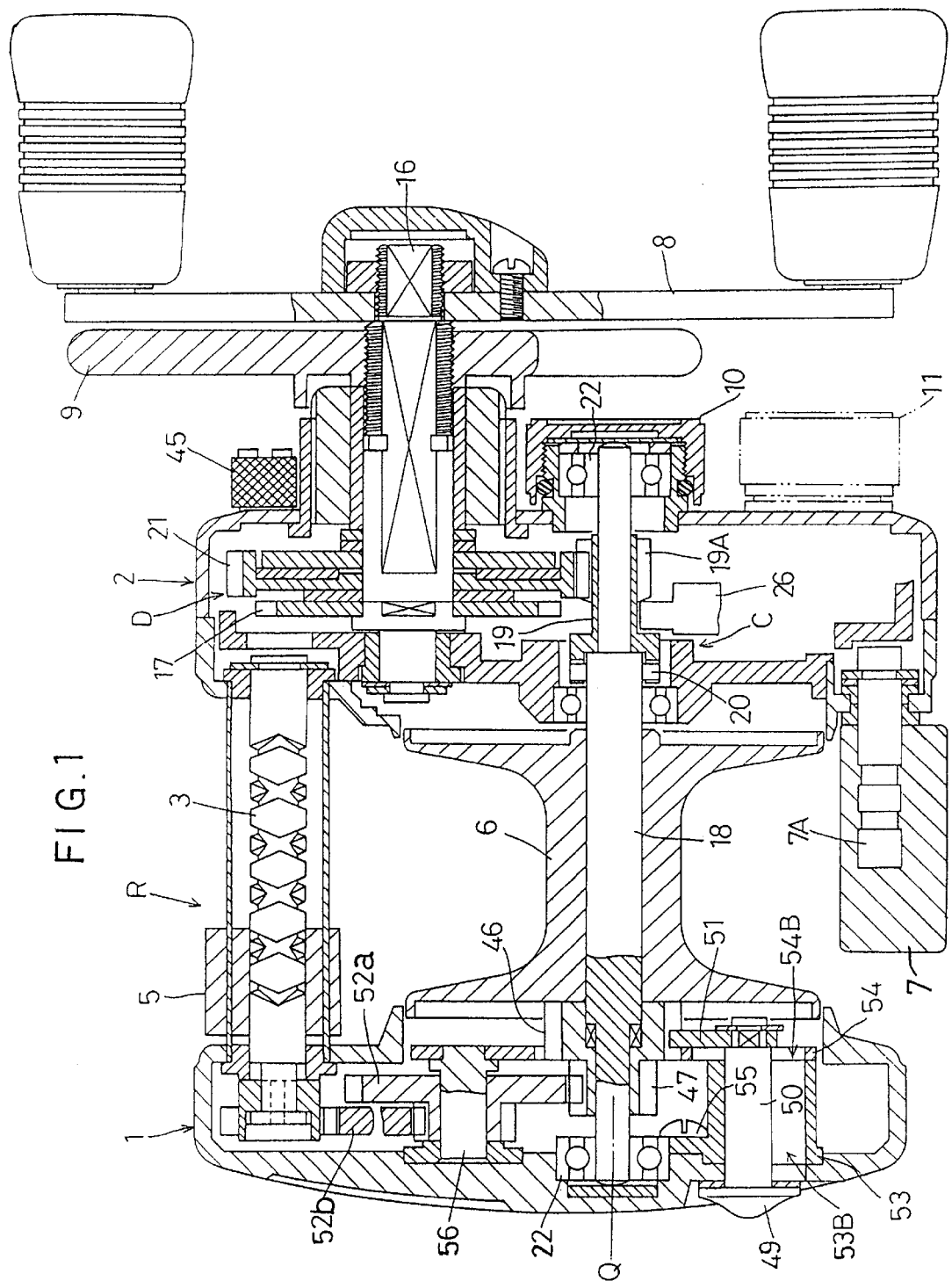
FIG. 1 is plan view in cross section of a reel.

Baitcasting reels and a method of manufacturing these reels according to the present invention will be described in detail with reference to the drawings.

As shown in FIGS. 1 through 9, a baitcasting reel comprises a reel body having a left case 1 and a right case 2. The reel body has a level wind mechanism R mounted in a front position thereof and including a screw shaft 3 and a line guide 5. Further, the reel body has a spool 6 mounted centrally thereof and a clutch controller 7 mounted in a rear position. The right case 2 supports a handle 8, a drag controller 9, a cast controller 10 and a brake controller 11.

In this reel, parts of the left case 1 and right case 2, and a thumb rest 12 and a pair of lower frames 13 interconnecting the two cases are formed into an integral unit A by aluminum die casting. To form the reel body, a lid B acting as part of the right case 2 is attached to the integral unit A. The reel body has a circular configuration in side view. The axis Q of the spool 6 is offset a predetermined amount upward from the center P of the circular configuration. The screw shaft 3 is disposed on a horizontal plane L level with the center P.

A mounting foot 14 is disposed between the pair of lower frames 13. The foot 14 has a vertical distance H not exceeding 40 mm from the center P, with the reel body having an outside diameter T within a range of 45 to 70 mm.

Figure 10:
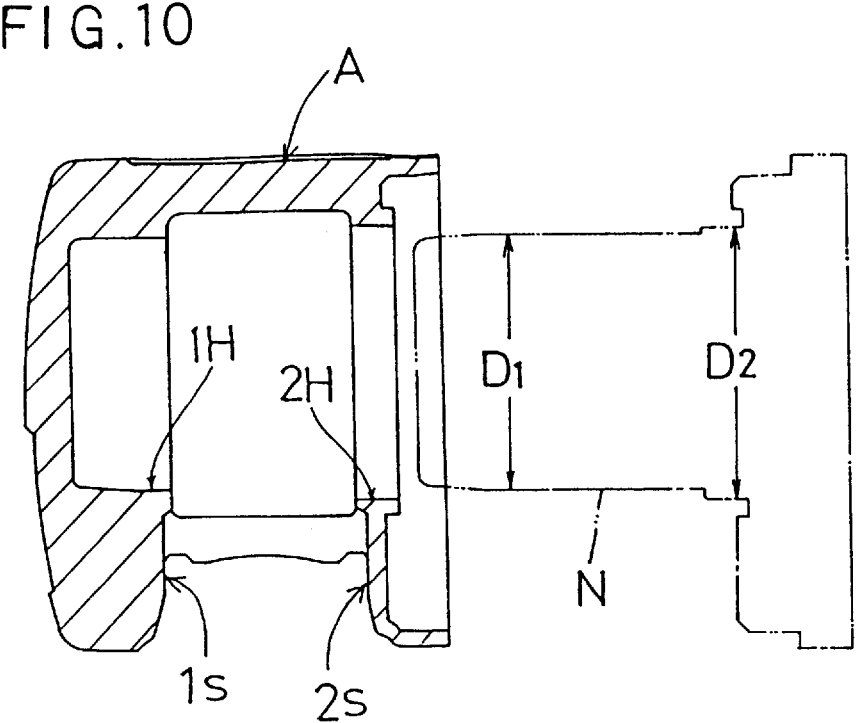
FIG. 10 is a sectional view of the integral unit after a die casting process.
Figure 11:
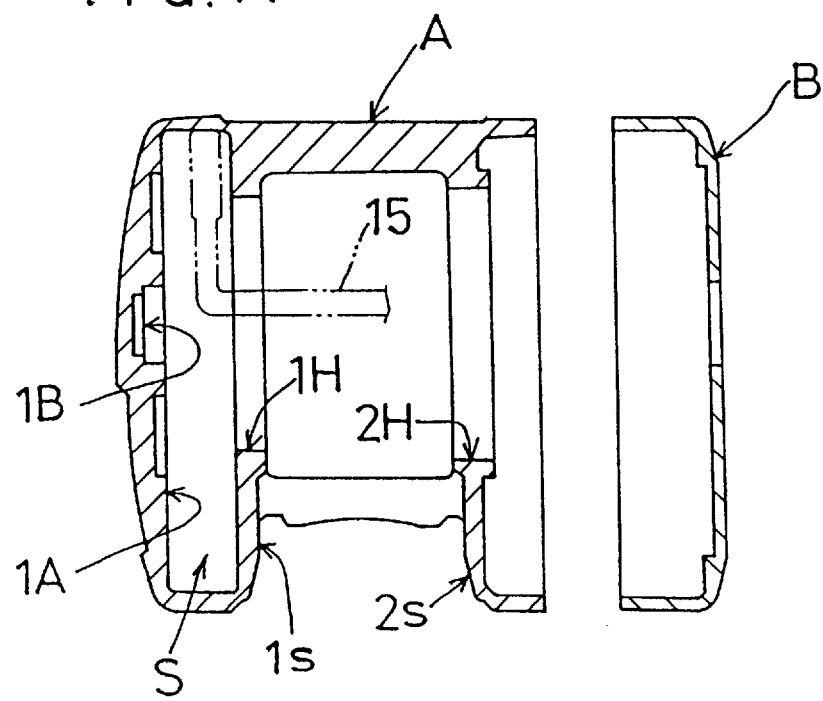
FIG. 11 is a sectional view of the integral unit after a cutting process.

As shown in FIG. 10, the integral unit A is formed by die casting. Further, as shown in FIG. 11, the left case 1 has a component mounting space S which is formed by boring with a cutting tool 15 inserted through spool inserting of openings 1H and 2H.

As shown in FIG. 10, a die N for forming the openings 1H and 2H has outside walls of a diameter D1 and a slightly larger diameter D2 so that the opening 2H is correspondingly larger than the opening 1H. Since the openings 1H and 2H are cut in an equal amount, the reel in the assembled state has the opening 2H slightly larger than the opening 1H.

To save as much time and trouble as possible in carrying out the boring process, an inside surface 1A of the outer wall is formed flat with no projection. This construction is preferable since a cutting operation may be carried out with less trouble than an operation for forming a component mounting projection, and since the case 1 has a reduced weight.

A bearing receiving recess 1B has a depth about ¼ to ¾ of the thickness of the bearing. The case 1 is cut such that an outside surface and an inside surface define substantially concentric circles and define a relatively small wall thickness in a sectional view seen in the direction along the axis Q of the spool 6. Further, inward surfaces (opposed to the spool) of walls 1S and 2S between which the level wind mechanism R is mounted, as well as inside peripheral surfaces of the openings 1H and 2H, are finished by cutting also.

Outside surfaces of the integral unit A and lid B are finished to form no difference in level, and treated with a bright alumite.

Figure 2:
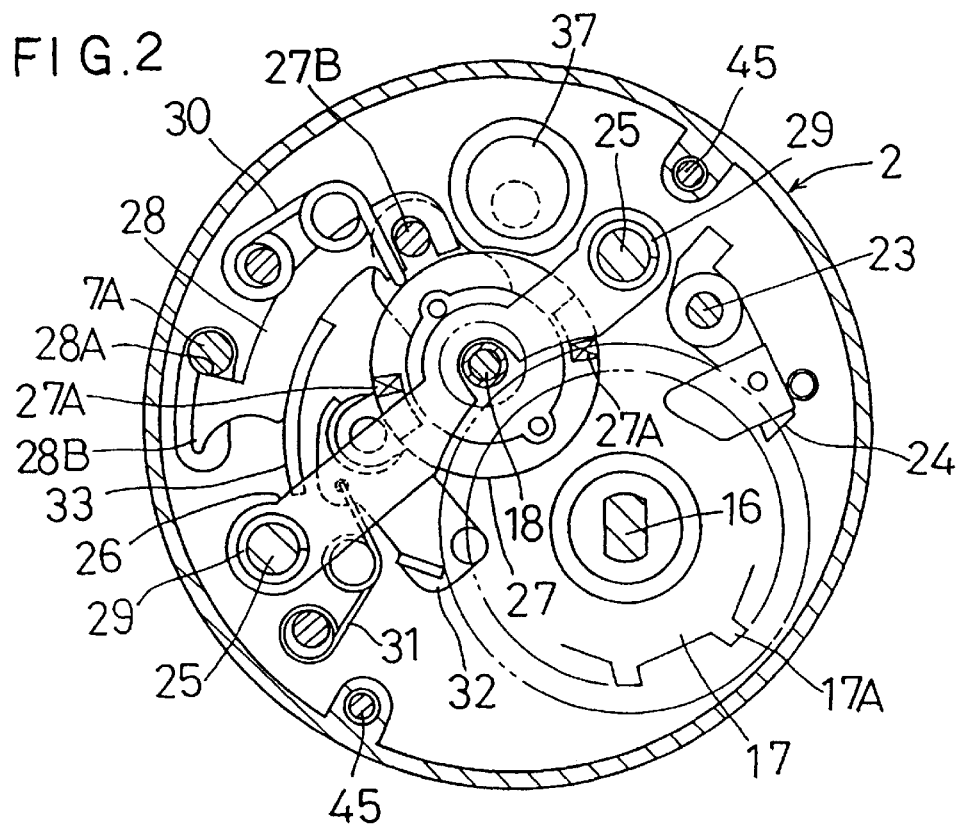
FIG. 2 is a side view of a clutch operating system.
Figure 3:
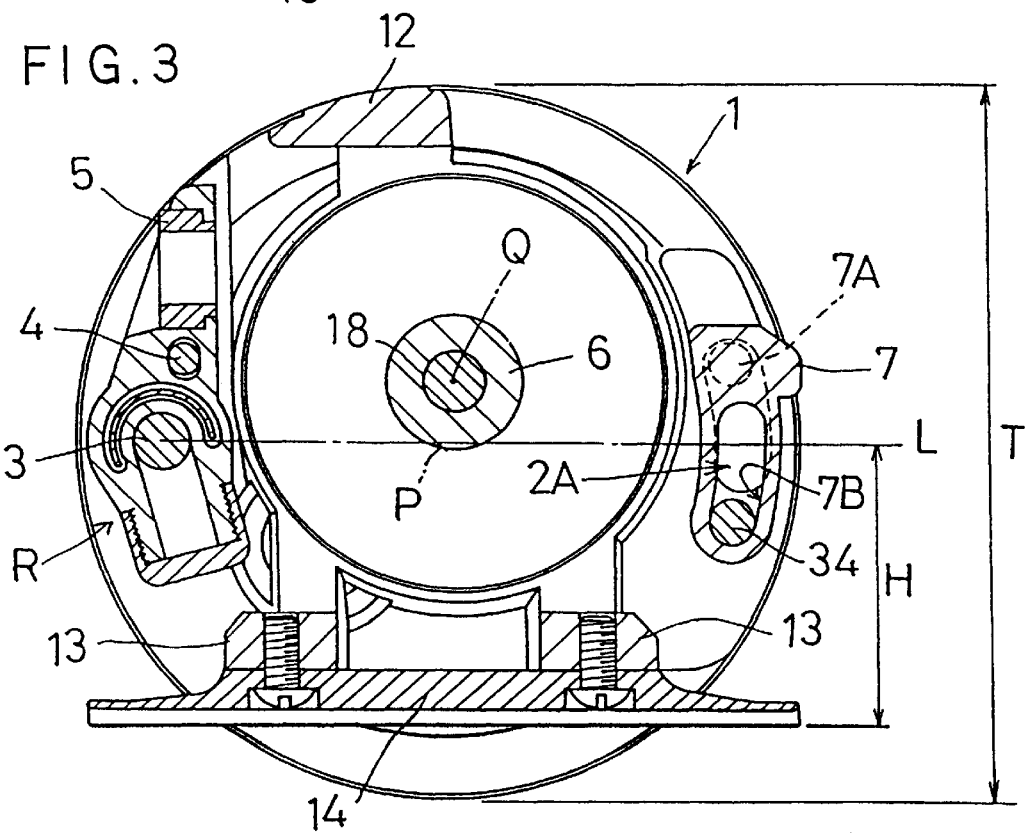
FIG. 3 is a side view in vertical section of the reel.

As shown in FIGS. 1 and 2, the handle 8 and drag controller 9 are mounted on a handle shaft 16 extending from the right case 2. The handle shaft 16 supports a drag mechanism D and a ratchet wheel 17 mounted on an inward end portion thereof. A spool shaft 18 rotatable with the spool 6 supports a clutch sleeve 19 slidably mounted thereon and a pin 20 fixed to the spool shaft 18 to be engageable with the clutch sleeve 19. The clutch sleeve 19 and pin 20 constitute a clutch mechanism C. The clutch sleeve 19 has an input gear 19A meshed with an output gear 21 of the drag mechanism D, whereby torque from the handle 8 is transmitted to the spool 6 through the drag mechanism D and clutch mechanism C.

The spool shaft 18 is supported at opposite ends thereof by bearings 22. The cast controller 10 is screwed to the right case 2 for adjusting a frictional force applied to the righthand end of the spool shaft 18. As shown in FIG. 2, the ratchet wheel 17 has teeth 17A engageable with a pawl 24 pivotable on an axis 23 to prevent backward turning of the handle 8.

As shown in FIG. 2, the clutch sleeve 19 is engaged with a shifter 26 slidably supported on a pair of support shafts 25. A rotary cam 2, is rotatably mounted coaxially with the axis Q of the spool 6. This rotary cam 27 defines a pair of cam surfaces 27A for sliding the shifter 26. The rotary cam 27 has an engaging pin 27B engaged with a link element 28 operable through contact with a control pin 7A of the clutch controller 7.

Compressing springs 29 are mounted on the support shafts 25 to urge the shifter 26 and clutch mechanism C to a clutch engaging position. A toggle spring 30 acts on the rotary cam 27 to maintain the rotary cam 27 in a position to engage or a position to disengage the clutch mechanism C. A further toggle spring 31 acts on a return arm 31 to switch the arm 31 to a position in which an end thereof interfere with the ratchet wheel 17 when the clutch mechanism C is set to the disengaged position. When disengaging the clutch mechanism C, the clutch controller 7 is depressed to place the link element 28 into contact with a guide 33. Then the link element 28 moves describing an arcuate locus while in contact with the guide 33 to rotate the rotary cam 27. As a result, the clutch mechanism C is disengaged through pressure contact with the cam surfaces 27A. When engaging the clutch mechanism C, the handle 8 is turned in a direction to take up the fishing line. This causes a tooth 17A of the ratchet wheel 17 to push the return arm 32 whereby the rotary cam 27 is returned. Consequently, the shifter 26 moves under the urging force of compression springs 29 to the position to engage the clutch mechanism C.

Figure 9:
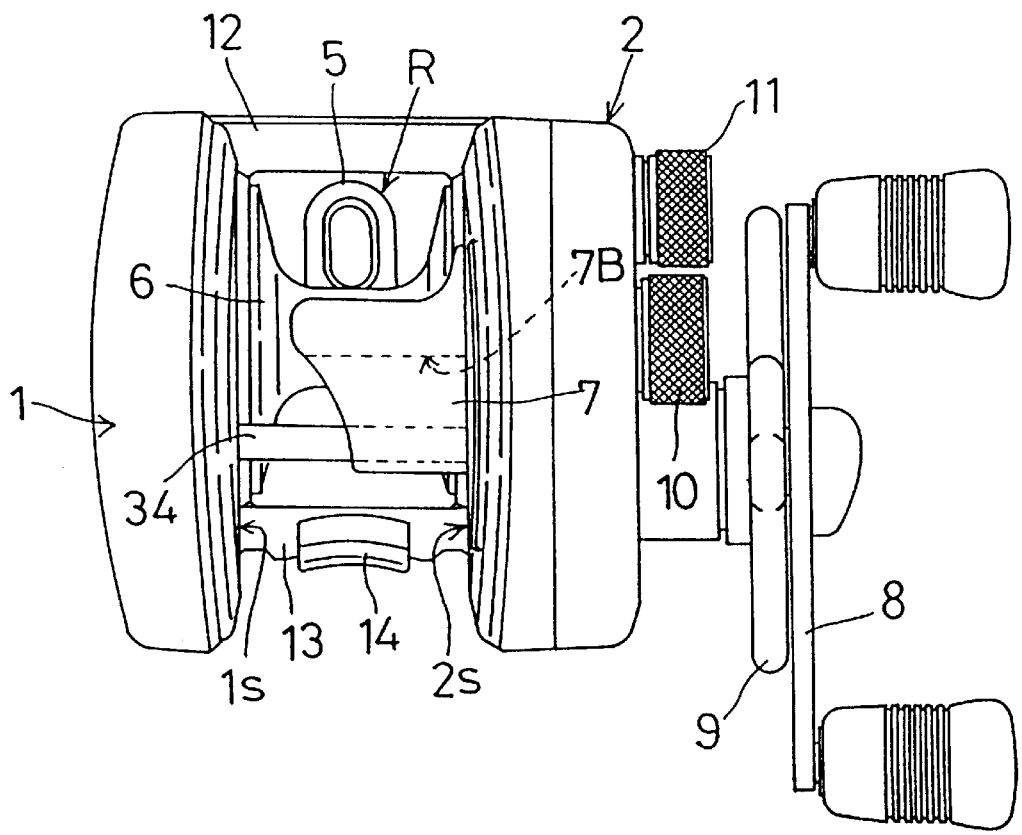
FIG. 9 is a rear view of the reel.

As shown in FIG. 9, the clutch controller 7 is supported to be slidable only relative to the wall 2S of the right case 2. The control pin 7A extends through an arcuate guide bore 2A so that the clutch controller 7 describes an arcuate locus about the center P of the reel body in side view. The clutch controller 7 defines an arcuate perforation 7B to receive a connecting frame 34.

It is necessary, when assembling the reel, to insert the control pin 7A into the guide bore 2A in such a way that the pin 7A is correctly placed above an engaging portion 28A of the link element 28. To facilitate this operation, the link element 28 includes a restricting projection 28B formed at a lower end thereof to stop insertion of the pin 7A to a position below the link element 28.

Figure 4:
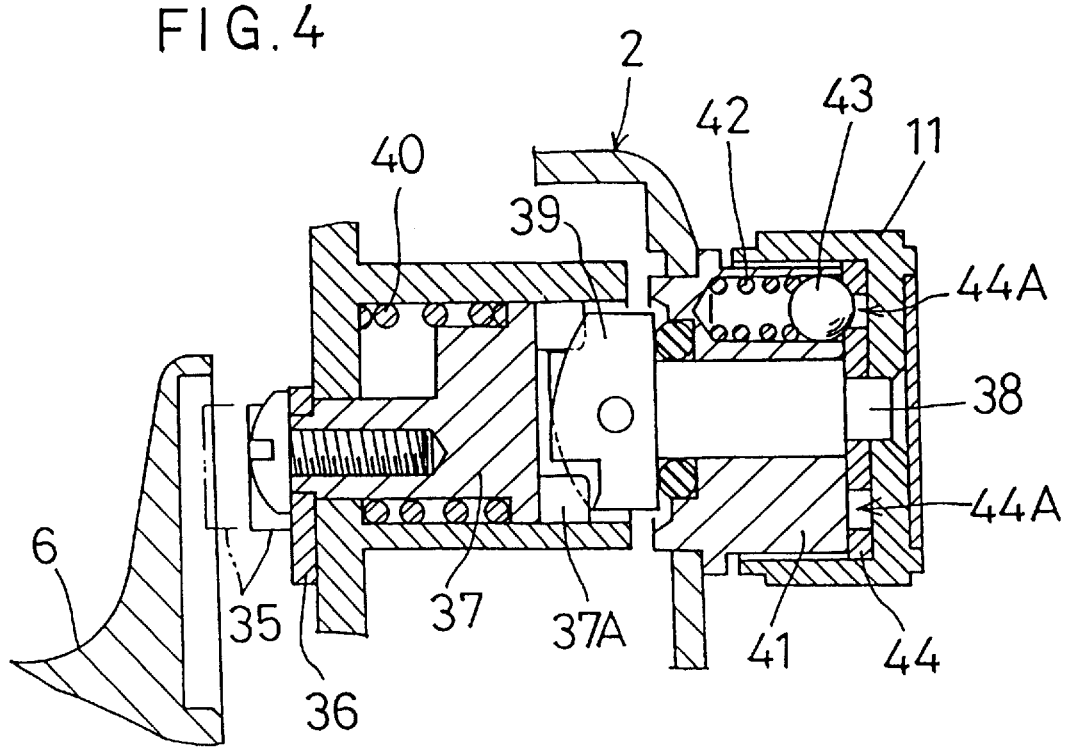
FIG. 4 is a sectional view of a brake control system.
Figure 5:
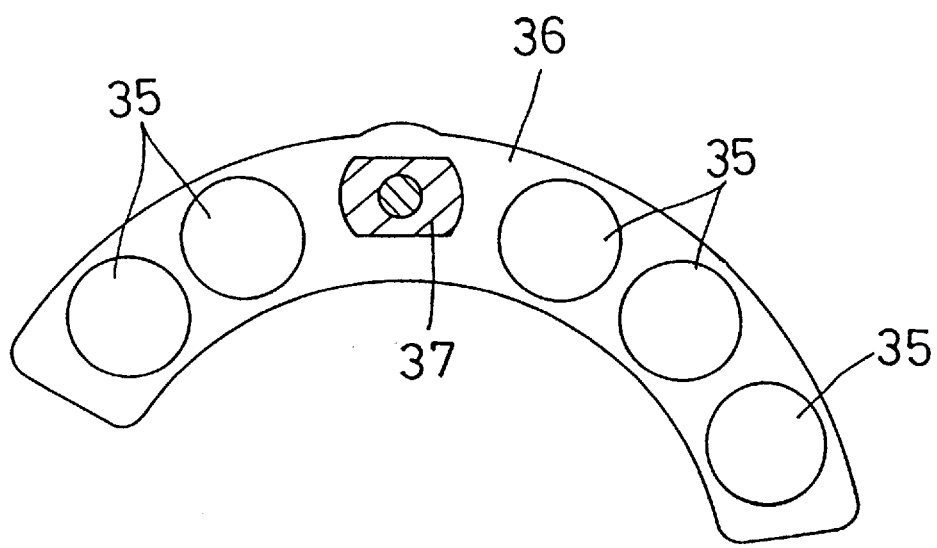
FIG. 5 is a side view of a brake plate.

As shown in FIGS. 4 and 5, the right case 2 has a magnet type brake mechanism mounted therein, whose braking force is adjustable by the brake controller 11. The brake mechanism includes a plate 36 disposed adjacent a side face of the spool 6 and having a plurality of magnets 35 a slide element 37 for supporting the plate 36 to be movable toward and away from the spool 6, a cam 39 connected to the brake controller 11 through a control shaft 38 for contacting a contact portion 37A of the slide element 37 to determine a position of the slide element 37 and a compression spring 40 for urging the slide element 37 away from the spool 6. A ball type detente mechanism is provided between the brake controller 11 and a supports 41 secured to the reel body. This detente mechanism includes a compression spring 42, a ball 43 urged by the spring 42, and a plurality of bores 44A formed in a disk 44 rotatable with the brake controller 11. The ball 43 is selectively engageable with the bores 44A to maintain the brake controller 11 in a control position.

With this brake mechanism, the closer the magnets 35 are to the side face of the spool 6, the greater eddy currents are generated at a casting time in the spool 6 formed of an aluminum alloy to produce the greater braking force.

The right case 2 may be opened by removing screws 45 and lid B.

Figure 6:
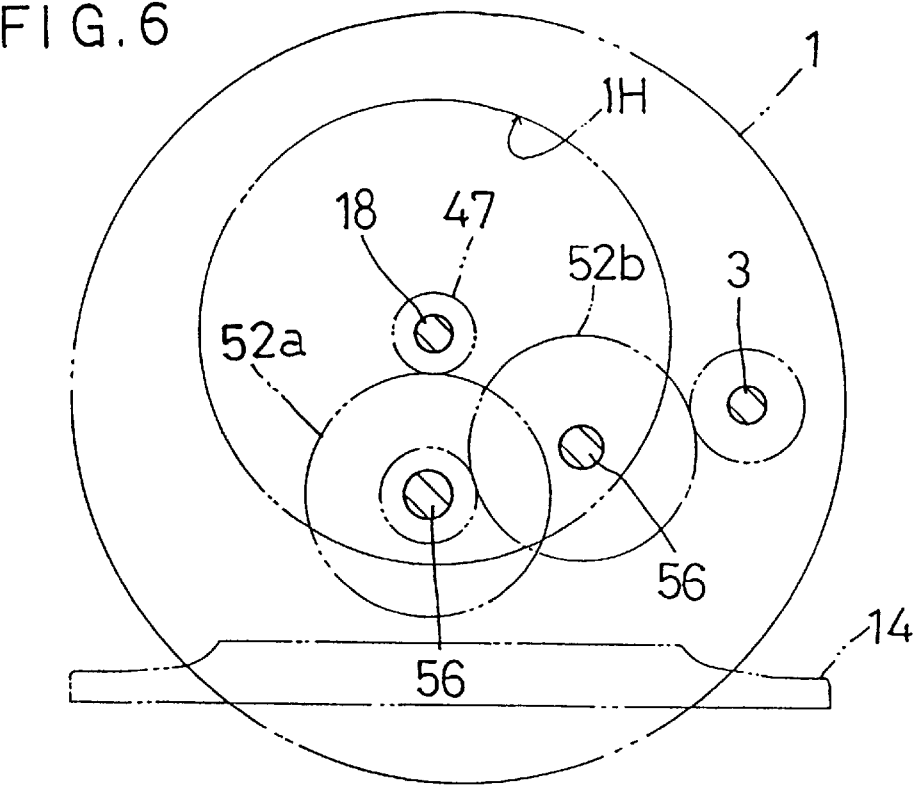
FIG. 6 is a side view of a transmission system for driving a level wind mechanism.
Figure 7:
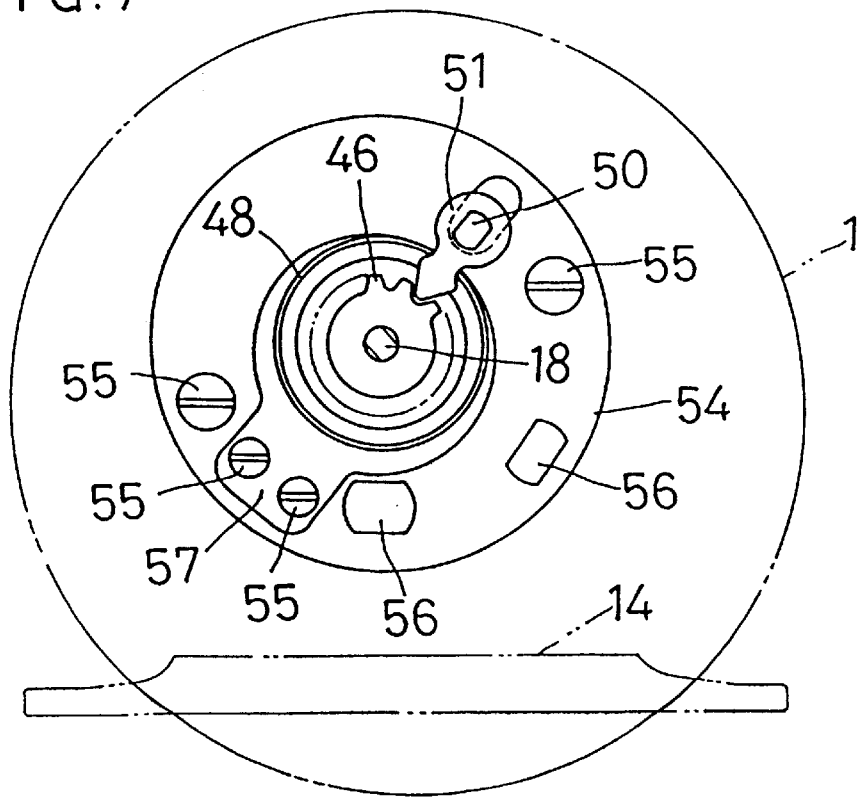
FIG. 7 is a side view of a clicking sound producing system.
Figure 8:
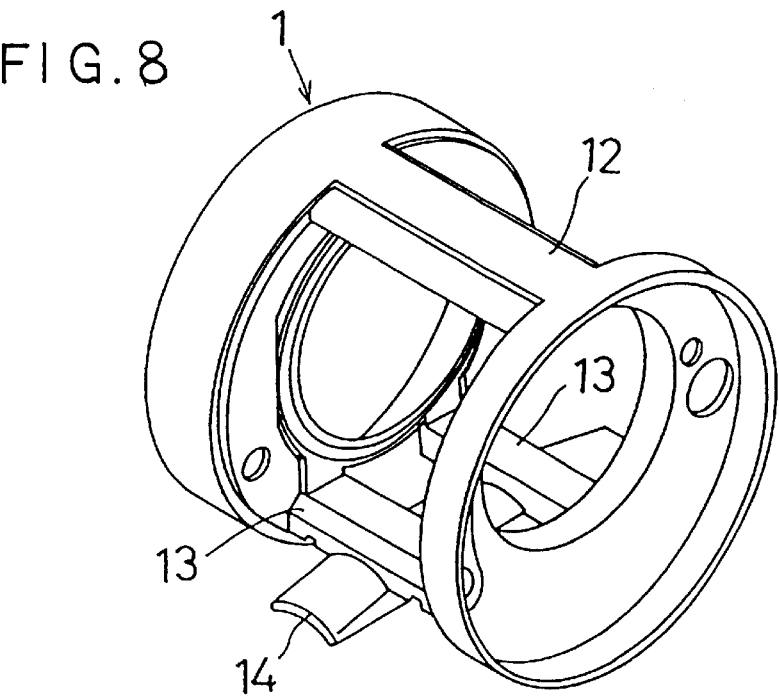
FIG. 8 is a perspective view of an integral unit.

As shown in FIGS. 1, 6 and 7, the spool shaft 18 carries fixed to a left end region thereof extending into the left case 1, an element having a first gear 46 for producing a clicking sound and a second gear 47 for transmitting drive to the level wind mechanism R. A clicking piece 51 is disposed adjacent the first gear 46, which is urged by a ring spring 48 defining a slit and is movable by a control knob 49 and a control shaft 50 into and out of engagement with the first gear 46. Further a transmission system is provided which includes a first and a second intermediate gears 52 for transmitting the drive from the second gear 47 to an input gear 3A mounted on the screw shaft 3. The transmission system and clicking system are mounted in the left case 1 and supported by two plates 53 and 54, respectively.

The outward plate is called herein a first plate 53 and the inward plate a second plate 54. The first plate 53 is fixed to the outer wall by a pair of screws 55 acting also as retainers for the bearing 22 supporting the spool shaft 18. The second plate 54 is fixed to projections of the first plate 53 by a pair of screws 55. The control shaft 50 extends through slots 53B and 54B defined in the first and second plates 53 and 54, respectively. The first and second intermediate gears 51 and 52 are supported on shafts 56 sandwiched between the first and second plates 53 and 54. The ring spring 48 is fixed to the second plate 54 through a bracket 57 by a pair of screws 55.

To facilitate assembly of the intermediate gears 52 the pair of shafts 56 are disposed inside the opening 1H of the left case 1 as seen in the direction along the axis of the spool shaft 18.

As another embodiment, the level wind mechanism R may be constructed as follows.

Figure 12:
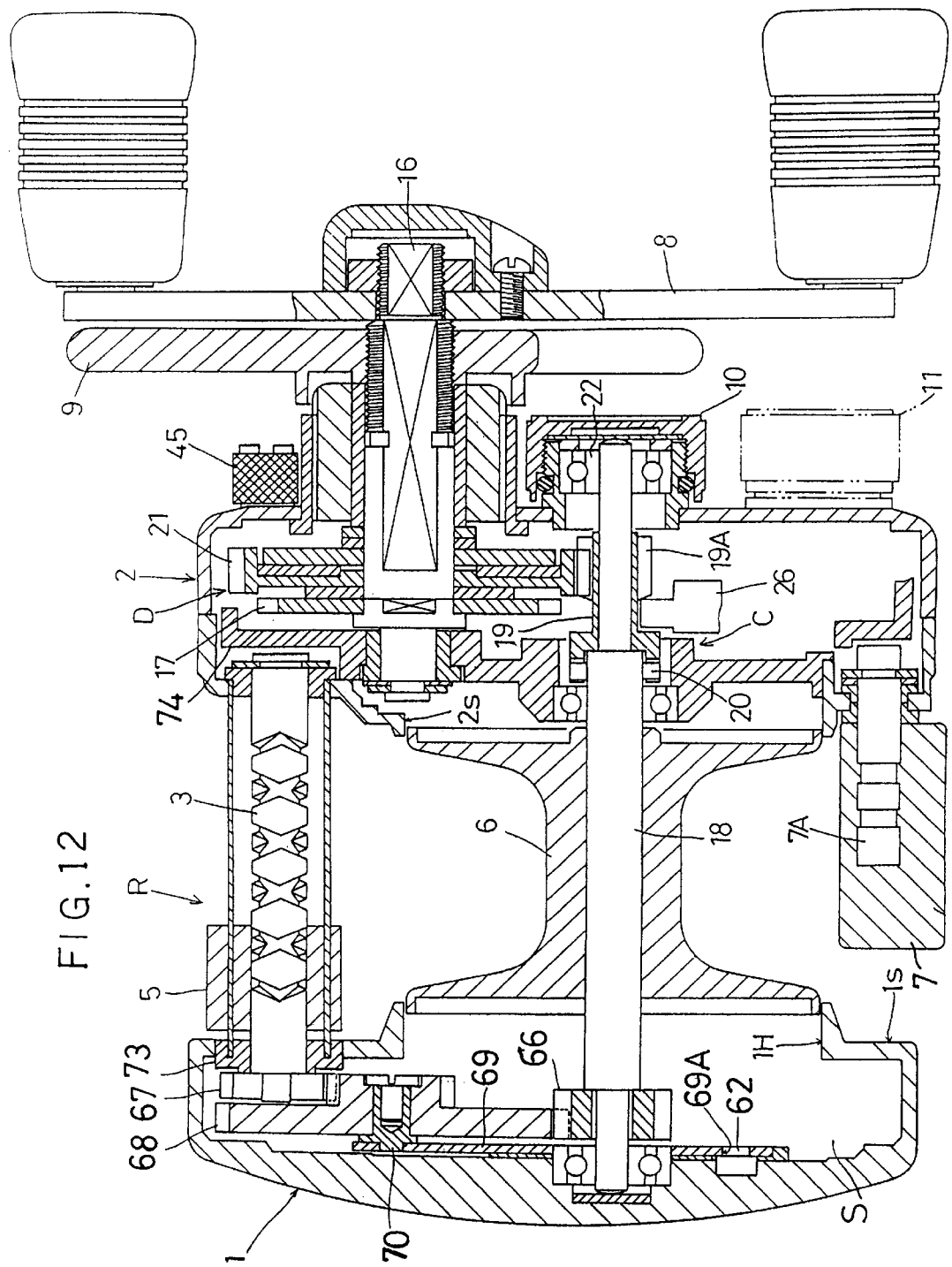
FIG. 12 is a sectional view of a reel in another embodiment of the invention.
Figure 13:
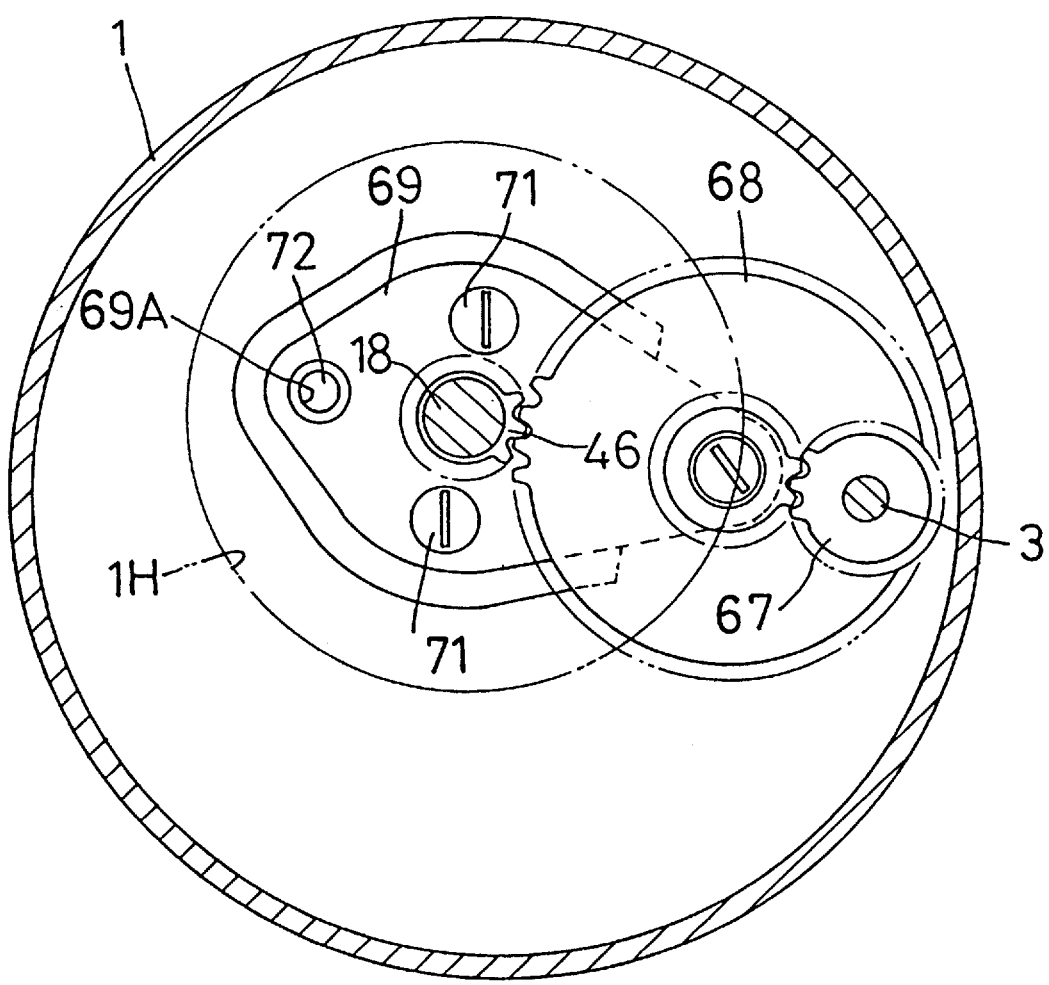
FIG. 13 is a side view of a support element and adjacent components.

As shown in FIGS. 12 and 13, an output gear 66 is mounted on the left end of the spool shaft. 18 extending into the left case 1 for transmitting the torque of the spool 6 to the level wind mechanism R. On the other hand, an input gear 67 is mounted on a left end of the screw shaft 3 of the level wind mechanism R. The left case 1 houses an intermediate gear 68 (an example of transmission mechanism) for transmitting drive from the output gear 66 to the input gear 67.

This intermediate gear 68 is attached to a plate-like support 69 through a shaft 70. In this reel, the support 69 carrying the intermediate gear 68 is inserted into the interior space through the opening 1H formed in the wall 1S of the left case 1 and fixed in position by screws 71.

The support 69 defines a bore 69A for receiving a pin 72 projecting from an inside wall of the left case 1, thereby determining a mounting posture of the support 69.

The left end of the screw shaft 3 is supported by the left case 1 through a bush 73 having a larger diameter than the input gear 67, so that the screw shaft 3 already carrying the input gear 67 may be assembled to the left case 1. An abutment element 74 is disposed adjacent the other end of the screw shaft 3 to determine position of the screw shaft 3.

This construction allows the transmission system to be provided with ease and without the necessity to form a special opening where the case 1 defines only the opening 1H.

Thus, an improved baitcasting reel is constructed in which the transmission system for transmitting drive from the spool to the level wind mechanism to be formed with little trouble while increased strength is secured with the integral formation of the reel body.

In this embodiment, the output gear 66, intermediate gear 68 and input gear 67 have their respective axes juxtaposed on a straight line. This arrangement is effective to check an increase in transmission resistance even when the support 69 should wobble with the drive transmitted from the output gear 66.

The present invention may be embodied in various other constructions such as including a shaft type transmission mechanism or a transmission mechanism having an increased number of gears, or including a different type of support.

A further embodiment will be described with reference to FIGS. 14 through 17.

A reel in this embodiment includes an annular flange member E with flanges disposed adjacent outer peripheries of side walls defining a line accommodating section 6A of the spool 6. An opening 65a is defined in a side face of a connector 65A of a center frame 65 acting also as a thumb rest for introducing the annular flange member E into the reel body. Further, mounting seats a are formed for positionally setting the annular flange member E in the reel body.

The annular flange member E formed separately from the reel body, compared with an integral formation thereof, allows use of a simple die for forming the flange member E or dispenses with a complicated cutting process such as boring when the flange member E is cut. The mounting seats defined on the reel body secure a positioning precision comparable to the case of forming annular flanges integral with the reel body. They also allow a relatively easy position setting of the bearing support and annular flange member whose positional relationship to the spool requires a strict control. Thus, the above construction conveniently realizes both improved manufacturing efficiency and easy position setting: the former achieved by forming the annular flange member as a separate component, and the latter by providing the mounting seats to facilitate the positional control comparable to the case of integral formation.

Figure 14:
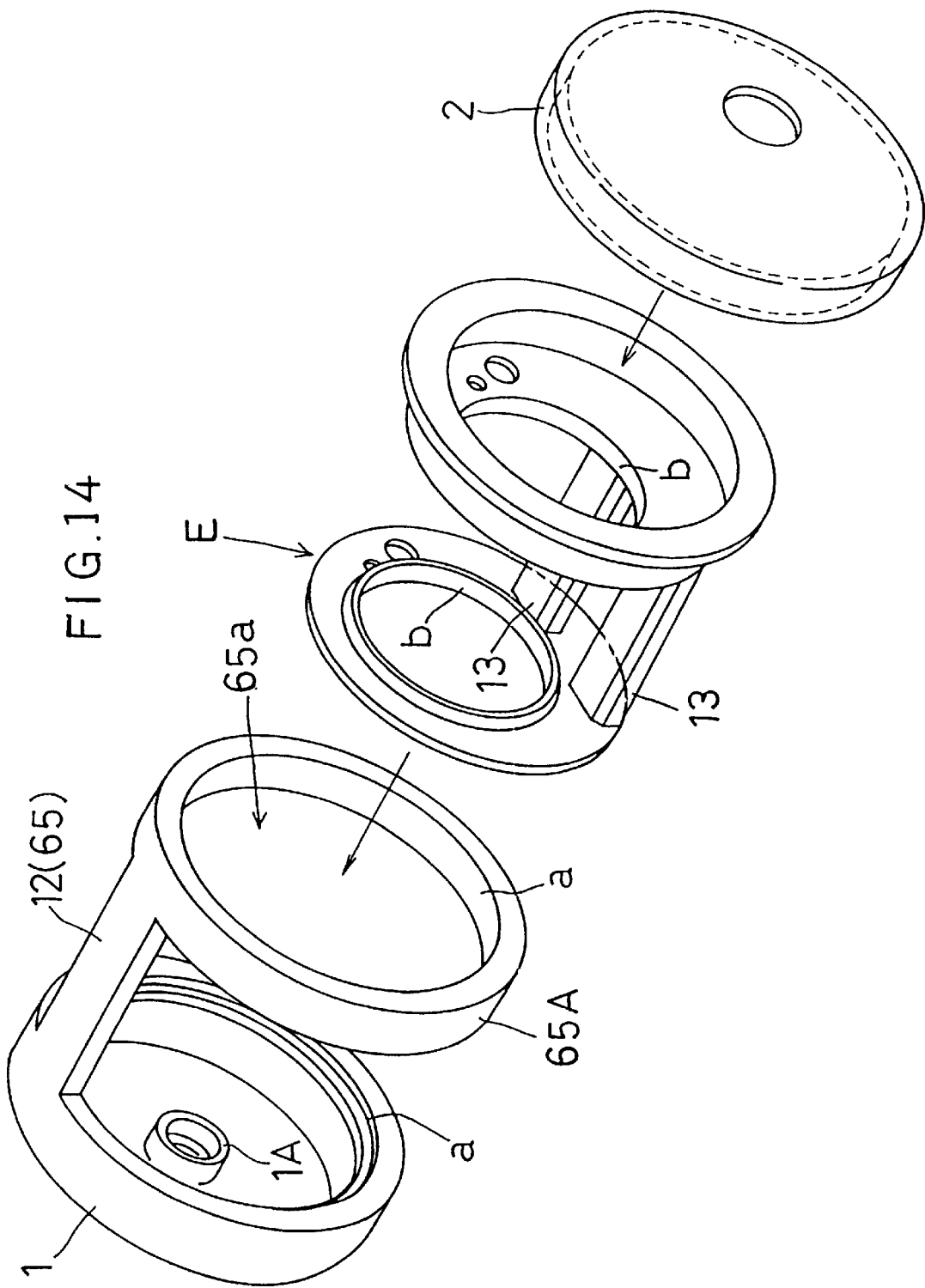
FIG. 14 is an exploded perspective view of an annular flange member prior to assembly to a reel body of a reel in a further embodiment.
Figure 15:
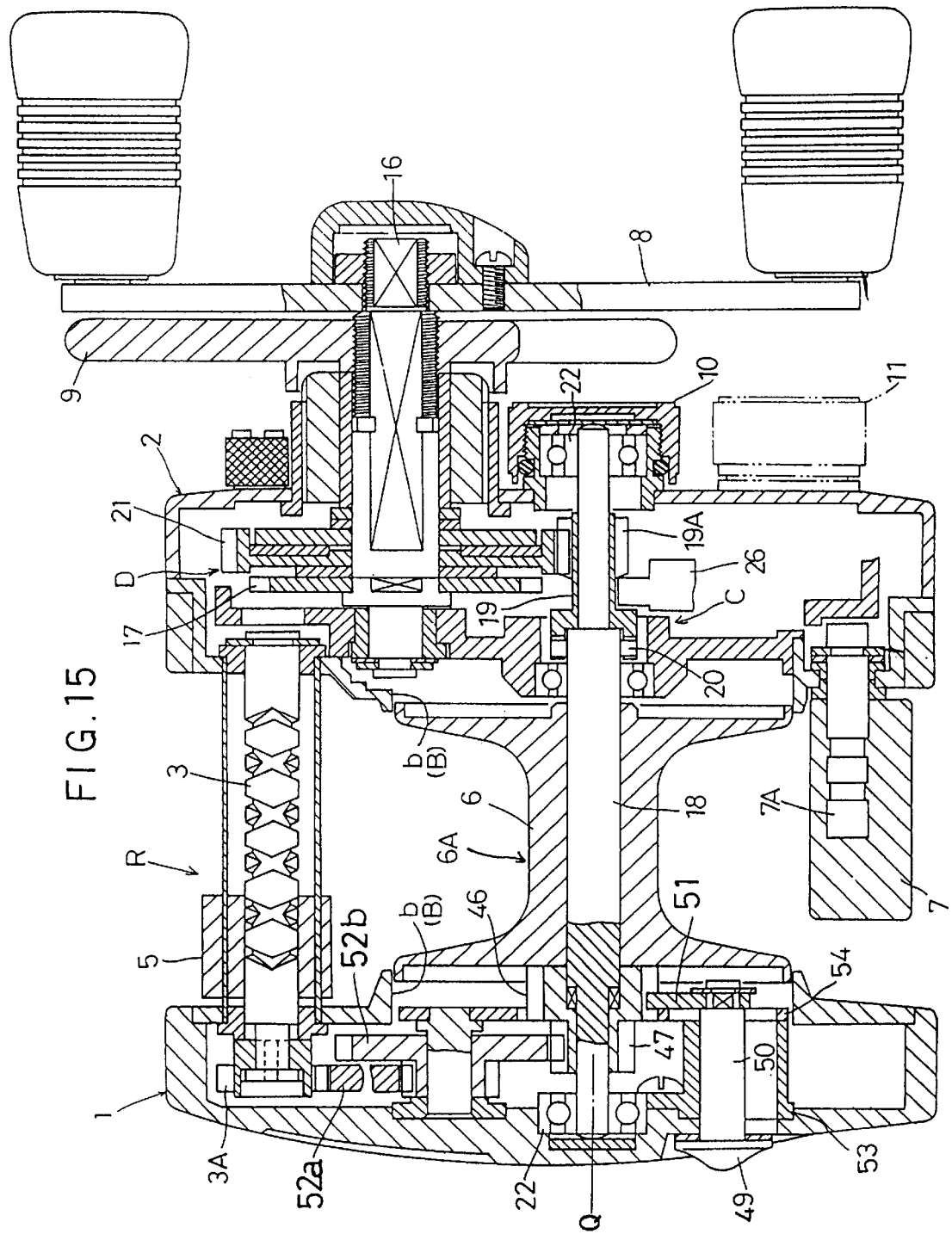
FIG. 15 is a plan view in cross section of the reel of FIG. 14.

As shown in FIGS. 14 and 15, the annular flange member E mounted in the reel body includes annular projections b disposed adjacent the outer peripheries of the side walls defining the line accommodating section 6A of the spool 6, and two lower frames 13 interconnecting the right and left annular projections b. This annular flange member E also is formed by die casting. The mounting foot may be secured to the lower frames 13 by caulking instead of using screws.

Figure 16:
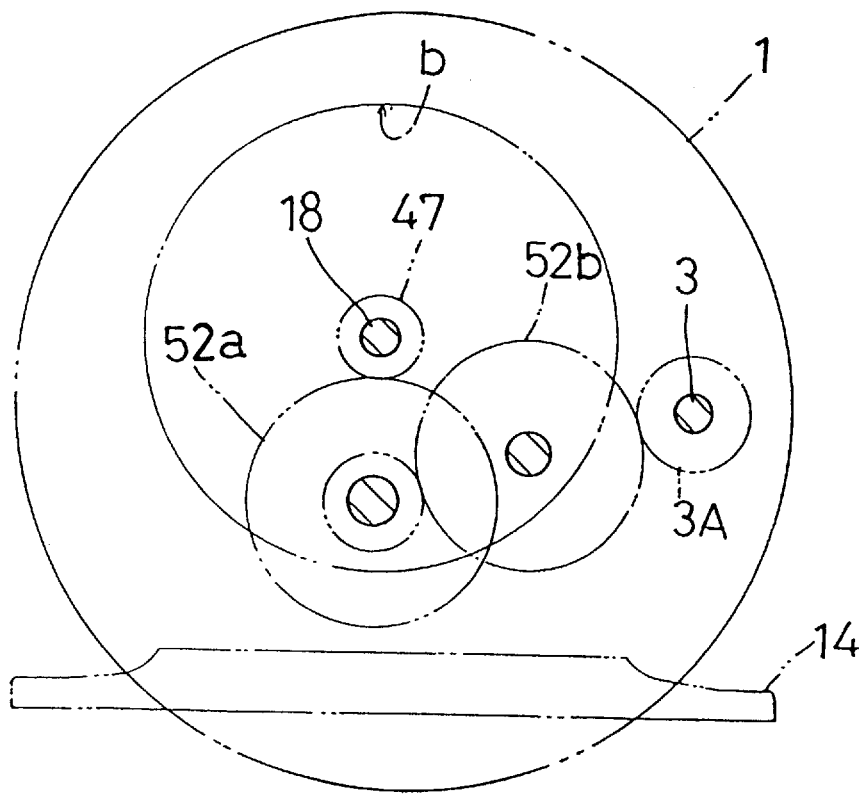
FIG. 16 is a side view showing a transmission system for a level wind mechanism in the reel of FIG. 14.

As shown in FIG. 16, the axes of a first and a second intermediate gears 52a and 52b are disposed inside an opening defined by the annular projections b in side view. Thus, the annular flange member E may be assembled to the reel body first, which is followed by insertion of the axes of the first and second intermediate gears 52a and 52b through the opening of one annular projection b. This provides increased freedom for assembly work.

A manufacturing process according to the present invention will be described next.

(a) The left case 1 and center frame 65 are formed integrally of an aluminum material by die casting. The annular flange member E also is formed likewise.

(b) The reel body is finished by cutting. The surfaces treated with the cutting finish are the outer peripheries of the reel body, the mounting seats a defined in the inner peripheries of the reel body f or contacting the annular flange member E, and the bearing support 1A for receiving the bearing 22 supporting the spool shaft 18. As a result of this finish, outer peripheral surfaces of the thumb rest 12, left side case 1 and connector 65A have smoothly continuing surfaces to exhibit an enhanced design effect and to give a fitting feel to the grip. The outer peripheral surfaces also continue, without a difference in level, to the right case 2 attached to the reel body.

(c) Next, the annular flange member E is inserted into the reel body through the opening 65a formed in the connector 65A of the reel body. The annular flange member E is then set in position on the mounting seats a, and secured to the reel body with screws, for example.

After a cutting finish, an alumite treatment is carried out to add brightness to the reel.

The above manufacturing process may be modified as follows:

(1) Instead of die casting, the reel body and annular flange member E may be formed by forging followed by cutting. Thus the manufacturing method material and shapes may be selected to suit specifications.

(2) The reel body may be formed of the right case 2 and center frame 65.

Figure 17:
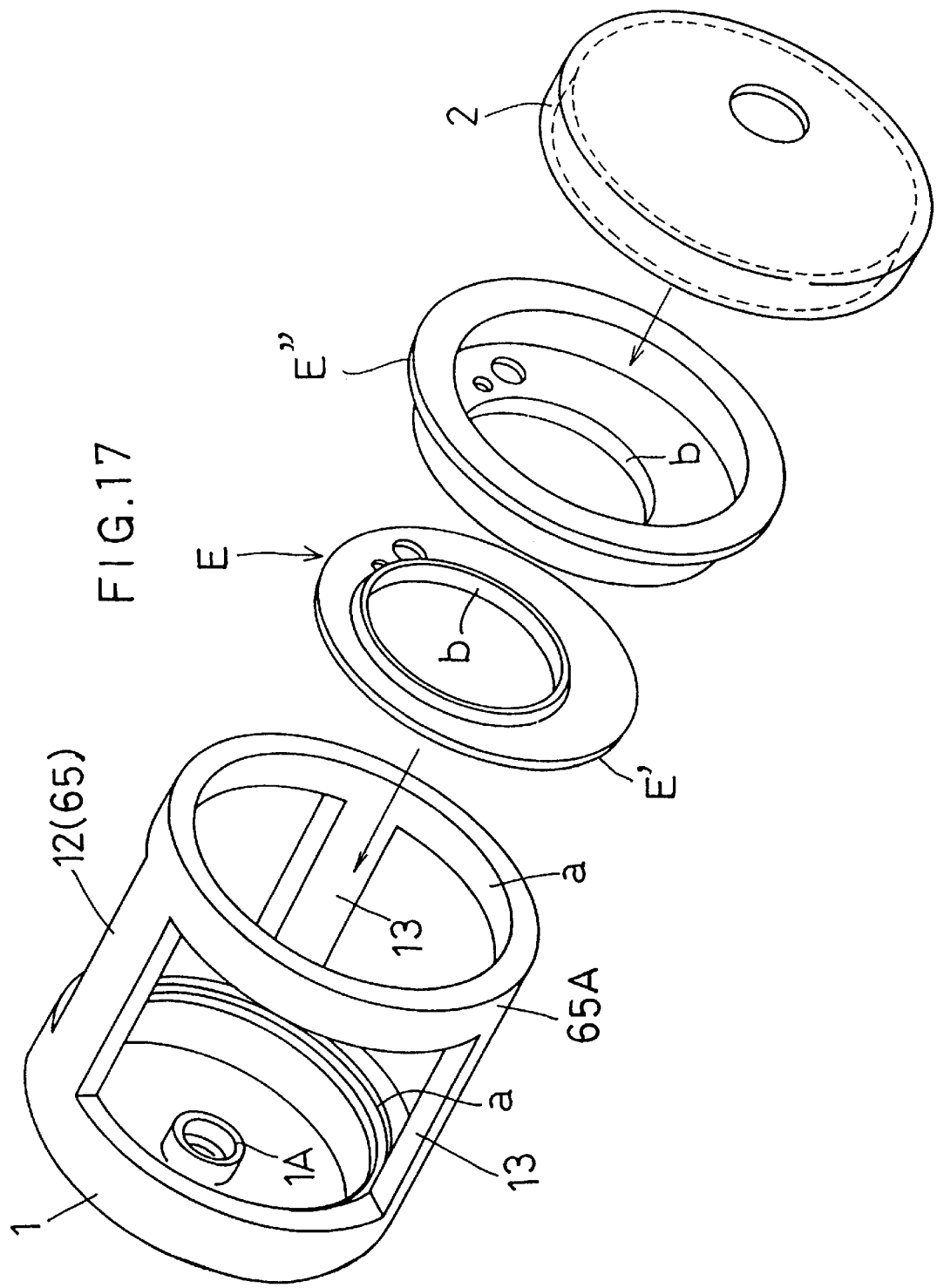
FIG. 17 is an exploded perspective view of a reel body in a further embodiment.

(3) The reel body may be formed in a different way as shown in FIG. 17. In this example the left case 1 and the connection 65A to the right case 2 are formed by die casting to be integral with the thumb rest 12 and lower frames 13, and left and right annular flanges E' and E" are formed independently of this integral die cast unit for fitting on mounting seats a. With the integral formation, the thumb rest 12 and lower frames 13 may be arranged circumferentially equidistantly. This construction has the advantage of having the left case 1 and center frame 65 formed without distortion.

Figure 18:
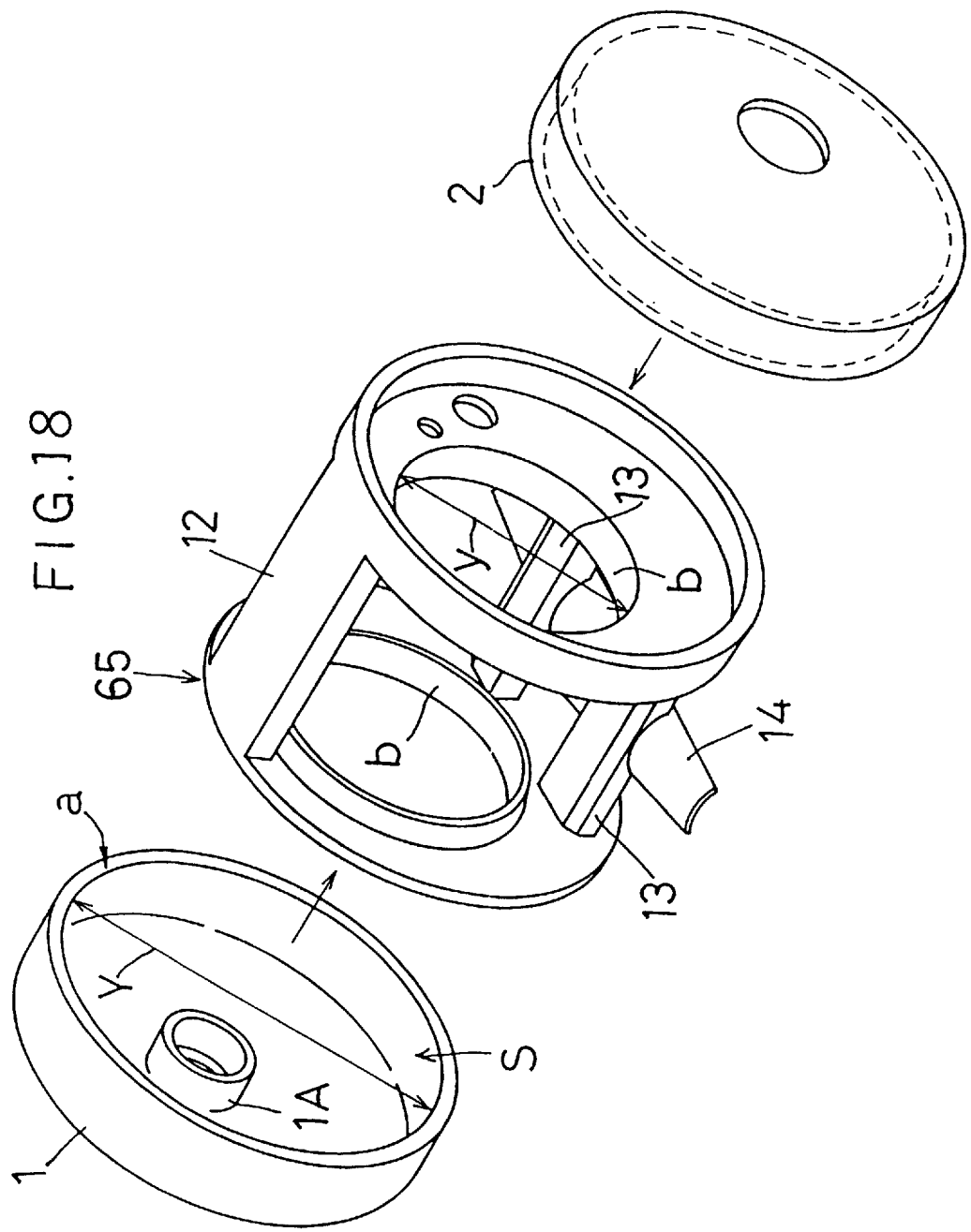
FIG. 18 is an exploded perspective view of a reel body in a still further embodiment.
Figure 19:
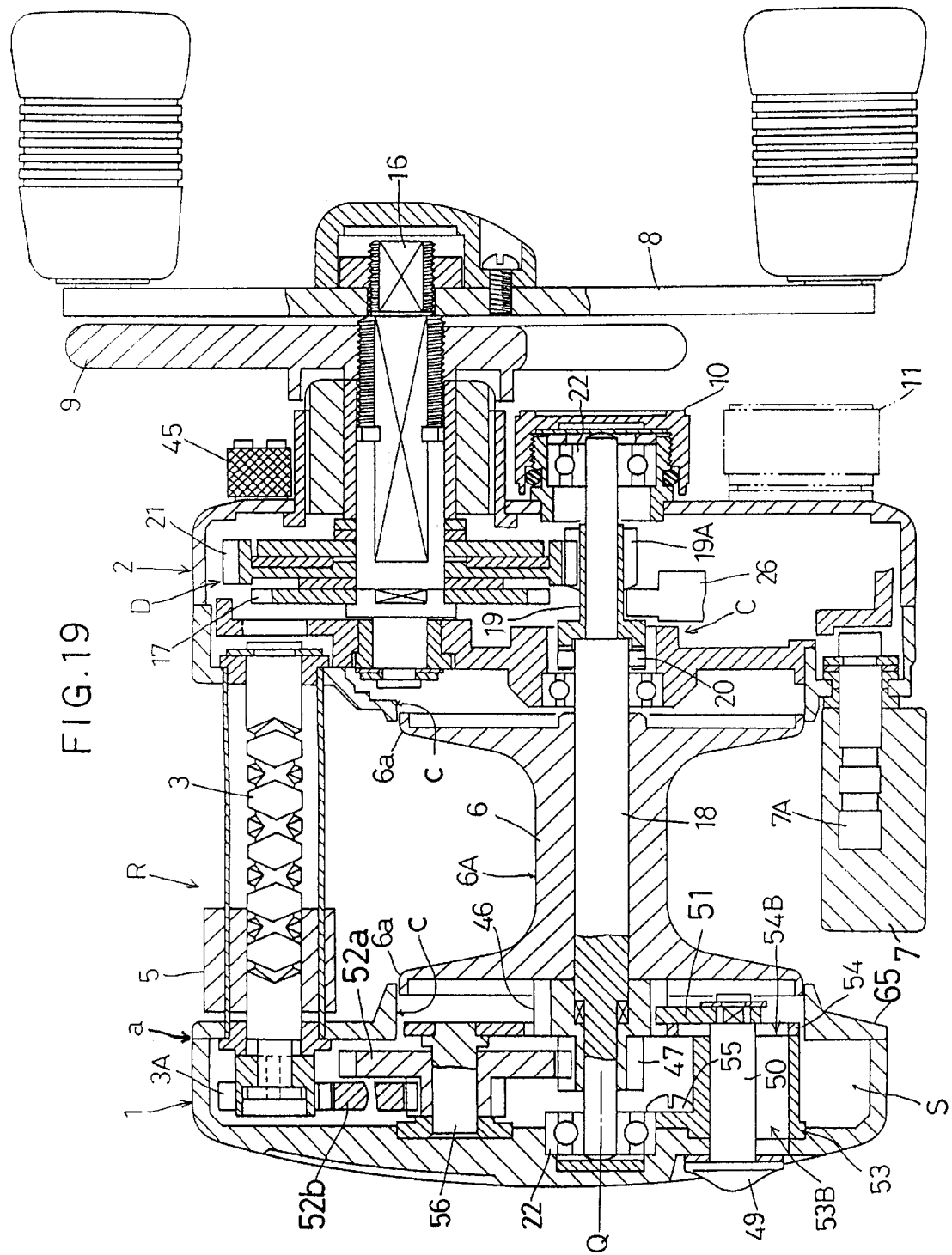
FIG. 19 is a plan view in cross section of the reel of FIG. 18.
Figure 20:
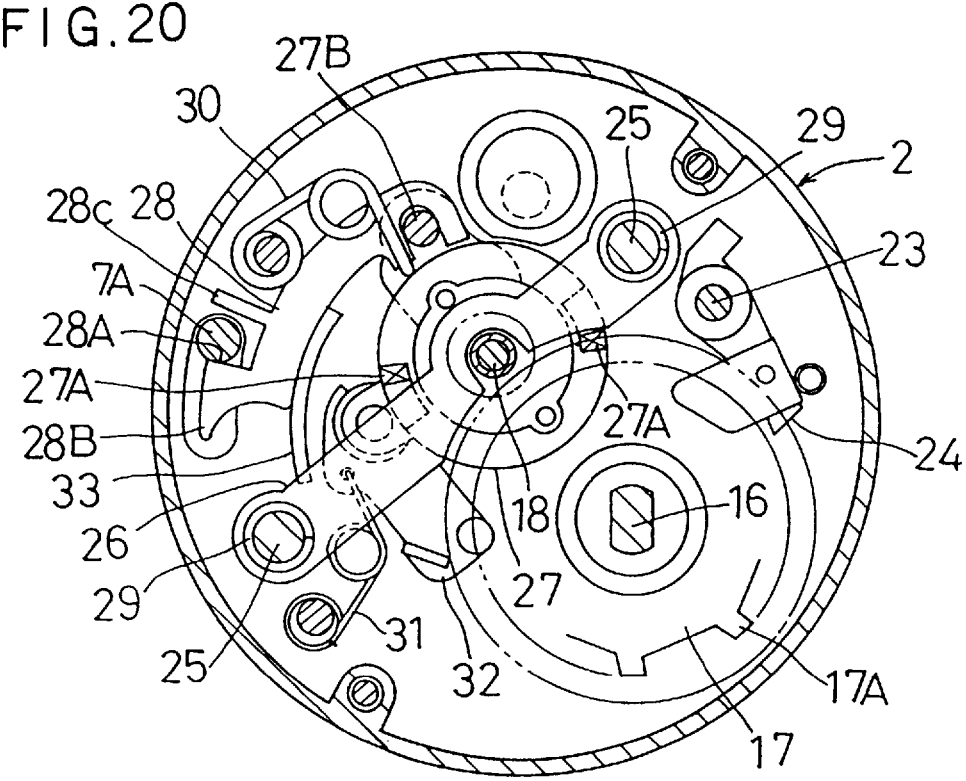
FIG. 20 is a side view in vertical section of a right case of the reel of FIG. 18.

FIGS. 18 through 20 show a further embodiment of the present invention. The reel body illustrated therein includes a left case 1 having a bearing support 1A for the spool 6, a right case 2 opposed to the left frame 1 and a center frame 65. The center frame 65 includes a connector connected to the right case 2, and annular flanges b disposed adjacent outer peripheries of side walls 6a defining a line accommodating section 6A of the spool 6 and having an inside opening diameter y smaller than an inside diameter Y of an interior space S of the left case 1. The center frame 65 is welded through welding surfaces a' to the left case 1 which is formed by casting. That is, the left case 1 is independently formed by casting, and the center frame 65 is rigidly welded to the cast left case 1.

In this construction, the left case 1 may have the interior space S having the inside diameter Y greater than the opening diameter y of the annular flanges b. Consequently, the integral formation by welding assures solidity while shortening the manufacturing process. This construction provides other advantages of achieving lightness and reducing restrictions regarding arrangement of components, for example.

As shown in FIG. 20, the link element 28 in this embodiment includes a projection 28C above the restricting projection 28B. The control pin 7A is sandwiched between an upper surface of the restricting projection 28B and the projection 28C disposed above.

Figure 21:
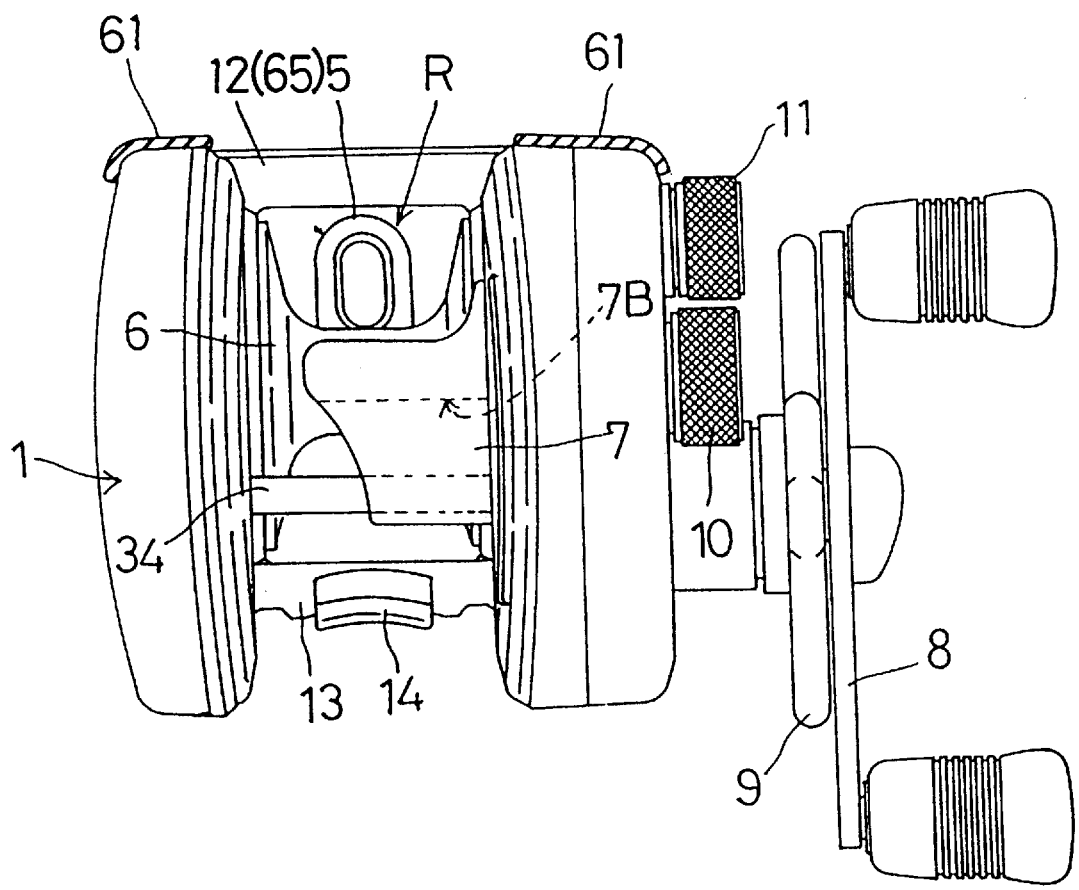
FIG. 21 is a front view of a reel in a further embodiment.

As shown in FIG. 21, a cover 61 may be placed on outer surfaces of the center frame 65. With this construction, the reel as attached to a fishing rod may be placed on the ground with the cover 61 contacting the ground allowing the reel itself to be out of contact with the ground. Protection may also be given to the alumite-treated outer surfaces of the reel body. The cover 61 may be provided over the entire circumferences of the right and left cases 1 and 2. Further the cover 61 may be formed of a resin, rubber or any other material.

A process of manufacturing this reel body will be described next.

(1) As shown in FIG. 18, the left case 1 and center frame 65 are separately formed by die casting. In particular, a sufficient component accommodating space is secured by forming the interior space S of the left case 1 having the inside diameter Y greater than the opening diameter y of the annular flanges b, as well as reductions in the wall thickness. The annular projections b are disposed adjacent the outer peripheries of the side walls defining the line accommodating section 6A of the spool 6 to prevent a fishing line as wound from slipping off the line accommodating section 6A.

(2) The separately formed left case 1 and center frame 65 are connected together through the opposed welding surfaces a' by a welding method such as friction welding, arc welding or pressure welding.

(3) A cutting process is carried out for the bearing support 1A for supporting the spool, inside surfaces of the annular flanges b, and outer surfaces of the integrated reel body to eliminate level differences at joints between the left case 1 and center frame 65.

(4) After the cutting, an allusive treatment is carried out to finish the reel body with brightness. After the cutting the reel body may be subjected to a painting treatment as well as the alumite treatment to form an integrated outer surface of the reel body without differences in level.

This manufacturing process may be modified as follows:

(a) The left case 1 may be formed of magnesium, titanium or other light metal instead of aluminum. The left and right cases 1 and 2 serve the purpose as long as they are formed substantially circular. Their shape may be varied to suit the way in which these cases 1 and 2 are used.

(b) The reel case may have either of the left and right cases 1 and 2 formed integral with the center frame 65.

(c) The center frame 65 may be formed by forging and cutting instead of casting.

(d) The casting method is not limited to any specific type, and may be a lost wax process or other casting process instead of die casting.

Figure 23:
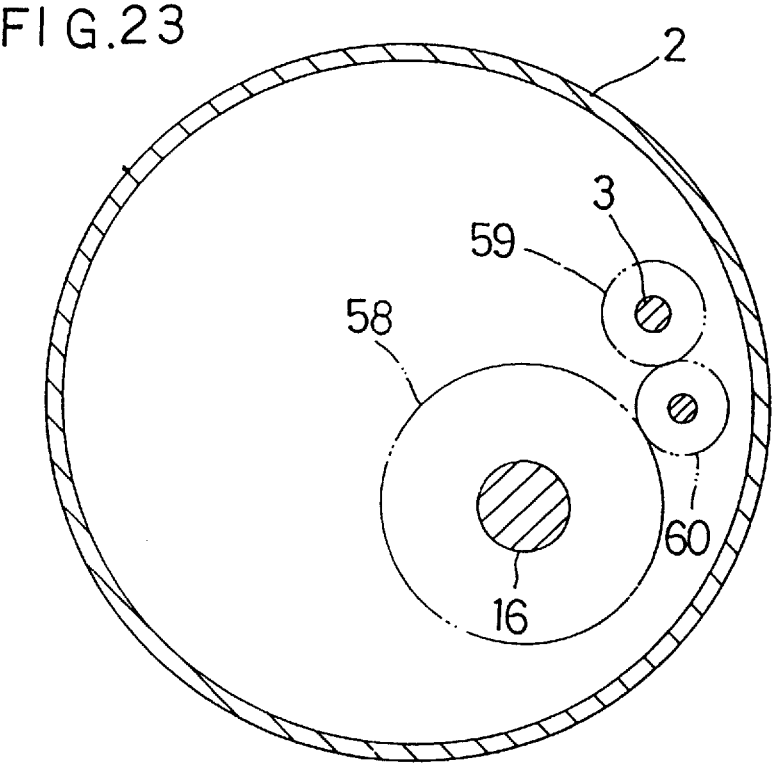

A different transmission system for the level wind mechanism R will be described with reference to FIGS. 22 and 23. A transmission system for transmitting drive from the handle shaft 16 to the Spool 6 includes an output gear 21 of the drag mechanism D mounted on the handle shaft 16 and an input gear 19A of the clutch sleeve 19 meshed with the output gear 21. On the other hand, the handle shaft 16 carries an output gear 58 connected through an intermediate gear 60 to an input gear 59 mounted on the screw shaft 3. These components constitute the transmission system for the level wind mechanism R. In this construction, the level wind mechanism R does not operate with rotation of the spool 6 when the fishing line is unwound with the clutch disengaged, thereby reducing the resistance to the fishing line being unwound to avoid power loss.

Apart from the foregoing embodiments, the present invention may be applied to a reel with a reel body having a non-circular configuration as seen in a direction along the axis of the spool.

According to the present invention any types of components may be mounted in the space formed by cutting such as a centrifugal brake. The shape of the reel body is variable in many ways.

What is claimed is:

1. A method of manufacturing a baitcasting reel, comprising the steps of:
    forming a one-piece integral unit, said unit including at least:
        a first case having a first inner wall and a first outer wall,
        a portion of a second case having a second inner wall, and
        a thumb rest interconnecting said cases, said unit being formed such that said first and second inner walls are opposite one another and provide support for a level wind mechanism;
    forming spool inserting openings in said first and second inner walls;
    providing a second outer wall for substantially covering said spool inserting opening formed in said second inner wall, said second outer wall positioned generally parallel to said first outer wall; and
    forming a substantially cylindrical first interior space inside said first case and between said first inner wall and said first outer wall, with the diameter of said first interior space being greater than the diameter of said spool inserting opening formed in said first inner wall.

2. A manufacturing method as claimed in claim 1, wherein said integral unit further includes a center frame, a connector portion and lower frames.

3. A manufacturing method as claimed in claim 2, further comprising the step of forming a bearing support for said spool in said second outer wall.

4. A manufacturing method as claimed in claim 3, wherein said integral unit is formed by aluminum die casting, said method further comprising the steps of:
    welding said second outer wall together with said integral unit;
    cutting said second outer wall and said integral unit to form level outer surfaces; and
    subjecting said first case and said integral unit to an alumite treatment.

5. A manufacturing method as claimed in claim 1, wherein said first interior space is formed by forming said integral unit by aluminum die casting such that said first case has an axially extending hole whose inner diameter is substantially the same as said diameter of said spool inserting opening of said first inner wall and by increasing said inner diameter of said hole by removing aluminum radially until said inner diameter is greater than said diameter of said spool inserting opening of said first wall.

6. A manufacturing method as claimed in claim 1, further including the step of providing spool bearing support on each of said first and second outer walls.

7. A manufacturing method as claimed in claim 1, further including the step of forming a substantially cylindrical second interior space inside said second case and between said second inner wall and said second outer wall, with the diameter of said second interior space being greater than the diameter of said spool inserting opening formed in said second inner wall of said second case.

8. A manufacturing method as claimed in claim 7, further including the step of providing spool bearing support on each of said first and second outer walls.

9. A method of manufacturing baitcasting reel, comprising the steps of:
    forming an integral unit, said unit including at least a first inner wall portion of a first case, at least a second inner wall portion of a second case, and a thumb rest interconnecting said inner wall portions, said unit being formed such that said first and second inner wall portions support a level wind mechanism;
    forming spool inserting openings in said first and second inner wall portions; and
    providing a first interior space in said first case by unremovably attaching a first outer wall to said integral unit such that said first interior space is substantially cylindrical and is formed between said first outer wall and said first inner wall portion and such that the diameter of said first interior space is greater than a diameter of said spool inserting opening formed in said first inner wall portion of said first case,
    providing a second interior space in said second case by unremovably attaching said second outer wall to said integral unit such that said second interior space is substantially cylindrical and is formed between said second outer wall and said second inner wall portion and such that the diameter of said second interior space is greater than a diameter of said spool inserting opening formed in said second inner wall portion of said second case.

10. A manufacturing method as claimed in claim 9, wherein said first outer wall is welded onto said integral unit so as to form a continuous outer surface between said first outer wall and said integral unit and wherein said second outer wall is welded onto said integral unit so as to form a continuous outer surface between said second outer wall and said integral unit.

11. A manufacturing method as claimed in claim 10, further including the step of subjecting said first and second outer walls and said integral unit to alumite treatment.

12. A method of manufacturing a baitcasting reel, comprising the steps of:
    forming a one-piece integral unit, said unit including at least:
        a first case having a first inside wall and a first outer wall continuously formed with said first inside wall;
        a second inside wall opposite said first inside wall for supporting a level wind mechanism, and
        a thumb rest interconnecting said first inside wall and said second inside wall, and
    forming spool inserting openings in said first and second inside walls;
    providing a second outer wall for substantially covering said spool inserting opening formed in said second inside wall, said second outer wall positioned generally parallel to said first outer wall; and
    providing a spool support on each of said first and second outer walls;
    forming a substantially cylindrical first interior space inside said first case to define said first inside wall and said first outer wall and to define said first outer wall covering said spool inserting opening in said first inside wall, the diameter of said first interior space being greater than the diameter of said spool inserting opening formed in said first inside wall.

13. A method of manufacturing a baitcasting reel body, said reel body comprising:

a first case having an inside wall and an outside wall, a second case provided opposite the first case, the second case having an inside wall and an outside wall, interconnecting members connecting the first case to the second case, said method comprising the steps of:

forming a one-piece center frame, the center frame including the first case, the inside wall of the second case and the interconnecting members;

forming the inside and outside walls in the first case by removing material from within the first case;

forming spool openings in said inside walls of the first and second cases; and attaching the outside wall of the second case to said center frame to cover the inside wall of the second case.

14. The method of claim 13, wherein the step of forming the center frame is performed by die casting said frame.

15. The method of claim 13, wherein the step of forming the one-piece center frame is performed by machining a block of material.

16. The method of claim 13, wherein the step of forming spool openings is performed before the step of forming the inside and outside walls in the first case, wherein material is removed from within the first case by inserting a cutting tool inside the spool opening of the first case and cutting material from the first case.

17. The method of claim 16, wherein an inside diameter of the first case is greater than a diameter of the spool opening of the inside wall of the first case.

18. The method of claim 13, wherein the outside wall of the first case forms a continuous face with the center frame.

19. The method of claim 13, further comprising a step of subjecting the center frame to alumite treatment.

20. A method of manufacturing a baitcasting reel body, said reel body comprising:

a first case having an inside wall and an outside wall, a second case provided opposite the first case, the second case having an inside wall and an outside wall, interconnecting members connecting the first case to the second case, said method comprising the steps of:

injection molding a center frame, the frame including the first case, the inside wall of the second case and the interconnecting members;

cutting material out of an interior of the first case to form the inside and outside walls of the first case; and forming spool openings in said inside walls of the first and second cases.

21. A method of manufacturing a baitcasting reel body, said reel body comprising:

a first case having an inside wall and an outside wall, a second case provided opposite the first case, the second case having an inside wall and an outside wall, interconnecting members connecting the first case to the second case, said method comprising the steps of:

cutting, from a block of metal, a center frame, the frame including the first case, the inside wall of the second case and the interconnecting members;

cutting material out of an interior of the first case to form the inside and outside walls of the first case; and forming spool openings in said inside walls of the first and second cases.

\* \* \* \* \*